US011487567B2

United States Patent
Loftus et al.

(10) Patent No.: US 11,487,567 B2
(45) Date of Patent: Nov. 1, 2022

(54) TECHNIQUES FOR NETWORK PACKET CLASSIFICATION, TRANSMISSION AND RECEIPT

(71) Applicant: Intel Corporation, Santa Clara, CA (US)

(72) Inventors: Ciara Loftus, County Galway G (IE); Subarna Kar, Hillsboro, OR (US); Namakkal Venkatesan, Portland, OR (US); Mark D. Gray, Shannon (IE)

(73) Assignee: Intel Corporation, Santa Clara, CA (US)

( * ) Notice: Subject to any disclaimer, the term of this patent is extended or adjusted under 35 U.S.C. 154(b) by 793 days.

(21) Appl. No.: 16/181,145

(22) Filed: Nov. 5, 2018

(65) Prior Publication Data

US 2019/0087218 A1 Mar. 21, 2019

(51) Int. Cl.
*H04L 12/66* (2006.01)
*G06F 9/455* (2018.01)
*H04L 69/22* (2022.01)
*H04L 45/745* (2022.01)
(Continued)

(52) U.S. Cl.
CPC ...... *G06F 9/45558* (2013.01); *G06F 9/45533* (2013.01); *H04L 45/745* (2013.01); *H04L 47/50* (2013.01); *H04L 49/70* (2013.01); *H04L 69/22* (2013.01); *G06F 2009/45575* (2013.01);
(Continued)

(58) Field of Classification Search
CPC ............ G06F 9/45533; G06F 9/45558; G06F 2009/45575; G06F 2009/45583; G06F 2009/45595; H04L 45/745; H04L 47/50; H04L 49/70; H04L 69/22
See application file for complete search history.

(56) References Cited

U.S. PATENT DOCUMENTS 7,966,620 B2 * 6/2011 Mundkur ................ H04L 49/90
719/319
7,979,592 B1 * 7/2011 Pettey .................... G06F 13/404
710/3

(Continued)

OTHER PUBLICATIONS

Ram et al., Hyper-Switch: A Scalable Software Virtual Switching Architecture, USENIX Association, 12 pages, 2013.*

(Continued)

*Primary Examiner* — Frank Duong
(74) *Attorney, Agent, or Firm* — Compass IP Law PC

(57) ABSTRACT

A virtual machine (VM) can provision a region of memory for a queue to receive packet header, packet payload, and/or descriptors from the network interface. A virtual switch can provide a routing rule to a network interface to route a received packet header, packet payload, and/or descriptors associated with the VM to the provisioned queue. A direct memory access (DMA) transfer operation can be used to copy the received packet header, packet payload, and/or descriptors associated with the VM from the network interface to the provisioned queue without copying the packet header or payload to an intermediate buffer and from the intermediate buffer to the provisioned queue. A DMA operation can be used to transfer a packet or its descriptor from the provisioned queue to the network interface for transmission.

22 Claims, 8 Drawing Sheets

(51) Int. Cl.
  *H04L 47/50* (2022.01)
  *H04L 49/00* (2022.01)
(52) U.S. Cl.
  CPC .............. *G06F 2009/45583* (2013.01); *G06F 2009/45595* (2013.01)

(56) References Cited

U.S. PATENT DOCUMENTS

| | | | |
|---|---|---|---|
| 8,990,799 B1* | 3/2015 | Forecast | G06F 9/45558 718/1 |
| 10,318,334 B2* | 6/2019 | Floris van Beek van Leeuwen ... | G06F 9/45558 |
| 2005/0249228 A1 | 11/2005 | Cornett | |
| 2009/0006521 A1 | 1/2009 | Veal et al. | |
| 2012/0216188 A1* | 8/2012 | Tsirkin | G06F 9/45558 718/1 |
| 2016/0012003 A1* | 1/2016 | Chawla | G06F 13/4221 710/308 |
| 2018/0181421 A1 | 6/2018 | Connor et al. | |

OTHER PUBLICATIONS

Uhlig et al., Intel Virtualization Technology, IEEE, 9 pages, 2005.*
Dong et al., High Performance Network Virtualization with SR-IOV, IEEE, 10 pages, 2009.*
Rahore et al., PC-based Router Virtualization with Hardware Support, IEEE, 8 pages, 2012.*
"Virtual Machine Device Queues", https://www.intel.com/content/www/us/en/ethernet-products/converged, downloaded Oct. 30, 2018, 5 pages.
Righini, "Single-Root Input/Output Virtualization (SR/IOV with Linux Containers", https://software.intel.com/en-us/user/201765), published on Nov. 10, 2015, 17 pages.
Sreenivasamurthy et al, "SIVSHM: Secure Inter-VM Shared Memory", Technical Report UCSC-SSRC-16-01 May 2016, 9 pages.
Virtio-OSDev Wiki, "Virtio", https://wiki.osdev.org/Virtio, downloaded Oct. 11, 2018, 6 pages.
White Papers, "Introduction to Intel Ethernet Flow Director and Memcached Performance", Intel Ethernet Flow Director and Memcached Performance, 2014, 6 pages.

* cited by examiner

TECHNIQUES FOR NETWORK PACKET CLASSIFICATION, TRANSMISSION AND RECEIPT

TECHNICAL FIELD

Various examples are described herein that relate to techniques for packet classification, transmission and receipt.

BACKGROUND

Computing platforms offer processor, memory, storage, and network interface resources for use by software layers. Computing platforms can execute virtual machines (VMs) that allow those resources to be shared among different VMs. For example, VMs can share network interface resources for packet transmission and receipt.

DETAILED DESCRIPTION

Figure 1:
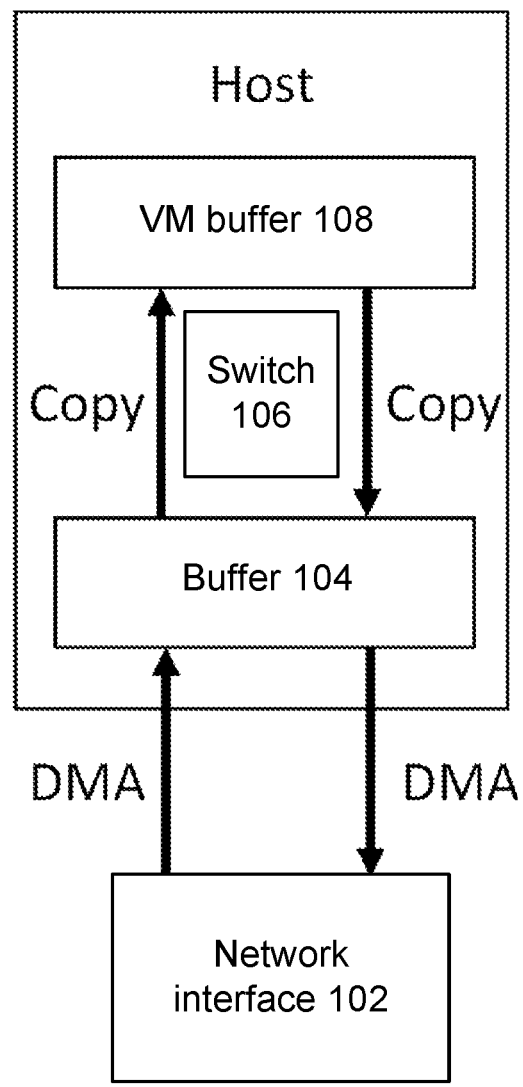
FIG. 1 depicts an example scenario of packet receipt and transmission.

Several known techniques for sharing data between devices are described next. Inter-VM Shared Memory (IVSHM) provides for data sharing in which a host shares one or more huge pages with a guest. Because both the host and guest have access to this memory, no copying of packets between the two entities occurs. However, there are security concerns from sharing host memory with a guest.

Single Root Input Output Virtualization (SRIOV) is a hardware technology for virtualizing a network interface device by partitioning the network interface device and assigning a partition directly to a VM. However, SRIOV does not allow for live migration or interfacing with a virtual switching technique such as Open vSwitch.

Virtual Machine Device Queues (VMDQ) is a network interface technology that sorts packets into VM queues based on Ethernet layer 2 information (e.g., source and destination MAC addresses) information. VMDQ directs packets to a queue solely based on MAC and VLAN information. VMDQ requires a copy from a receive queue of the network interface device to an intermediate buffer and another copy from the intermediate buffer to the VM buffer. Moreover, VMDQ has a limitation of one queue to be allocated per VM.

An embodiment provides for eliminating or reducing copy operations used for transferring a received packet and associated descriptor from a network interface to a queue associated with a virtual machine (VM). A VM can provision a region of memory for a queue to receive packet header, packet payload, and/or descriptors from a network interface. A descriptor can be data segments that enable the network interface to track transmit packets in the host memory. A virtual switch can identify that the region of memory is provisioned. The virtual switch can provide a routing rule to the network interface to route a received packet header, packet payload, and/or descriptors associated with the VM to the provisioned queue. The virtual switch can be executed by a host or network interface or both. A direct write transfer operation can be used to copy the received packet header, packet payload, and/or descriptors associated with the VM from the network interface to the provisioned queue without copying the packet header or payload to an intermediate buffer and from the intermediate buffer to the provisioned queue. For example, a direct write operation can be a direct memory access (DMA) operation. Properties of the received packet header can be used to create a mapping or routing rule. For example, a source or destination IP address in the header can be associated with the VM and its queue and a mapping or routing rule created to write any packet with the associated source or destination IP address into the VM's queue.

An embodiment provides for eliminating or reducing a copy operation used to transfer a packet for transmission by a network interface and its associated descriptors from a queue associated with a VM to a network interface. A virtual switch can monitor for availability of a packet to transmit for the VM. For example, the virtual switch can identify a transmit packet and/or descriptor formed for a packet and request the packet and/or descriptor be transferred to the network interface using a direct write operation. The packet header, payload, and/or descriptor can also be transferred from the provisioned queue to the network interface without copying first to an intermediate buffer and from the intermediate buffer to the network interface. The virtual switch can monitor properties of the packet header to determine if those properties are to be used to update or add a mapping or routing rule.

Various embodiments can be used with containers or VM alternatives. For example, a container can be software that packages code and all its dependencies so the application runs on one computing environment and can be transported to another computing environment.

Containers can be isolated from each other and bundle their own tools, libraries and configuration files but communicate with each other. Containers can be run by a single operating system kernel. As with VMs, containers may present the host with a virtual network interface. The virtual switch on the host sends/receives traffic to/from the container queues via that virtual interface.

FIG. 1 depicts an example scenario in which a packet is received by a network interface and a packet is transmitted by the network interface. A VM may function as self-contained software platform and use its own instantiation of a unique guest operating system. A VM can have its own binaries, libraries, and applications. Each VM may behave as if it were running on the virtual platform hardware and unaware of sharing of any compute, memory, storage, or networking resources. Received packets are transferred from network interface 102 to intermediate buffer 104 using a direct memory access (DMA) operation. Direct memory access (DMA) is a technique that allows an input/output (I/O) device to bypass a central processing unit (CPU) (not depicted), and to send or receive data directly to or from a system memory. Because DMA allows the CPU to not manage a copy operation when sending or receiving data to or from the system memory, the CPU can be available to perform other operations. Without DMA, when the CPU is using programmed input/output, the CPU is typically occupied for the entire duration of a read or write operation and is unavailable to perform other work. With DMA, the CPU can, for example, initiate a data transfer, and then perform other operations while the data transfer is in progress. The CPU can receive an interrupt from a DMA controller when the data transfer is finished.

Intermediate buffer 104 can store a copy of the received packet. Switch 106 classifies the received packet, and then the packet is copied from the intermediate buffer to a VM buffer 108 in memory. VM buffer 108 is associated with a VM that uses a Virtual Network Function (VNF).

For a packet transmission by a VM, the VM requests transmission using VNF and the packet is copied from VM buffer 108 to intermediate buffer 104. Switch 106 processes the packet and invokes a copy operation to transfer the packet from VM buffer 108 to network interface 102 using a DMA operation. Network interface 102 transmits the packet to the recipient.

For packet receipt, copying a packet from intermediate buffer 104 to VM buffer 108 uses processor resources to initiate and manage a copy operation, incurs the cost of memory space used for intermediate buffer 104, and introduces latency of a copy from intermediate buffer 104 to VM buffer 108. Packet transmission incurs similar resource use, memory use, and latency. The processor resource use, memory use, and latency grow with increasing packet sizes or with increased transmit or receive transactions.

Figure 2:
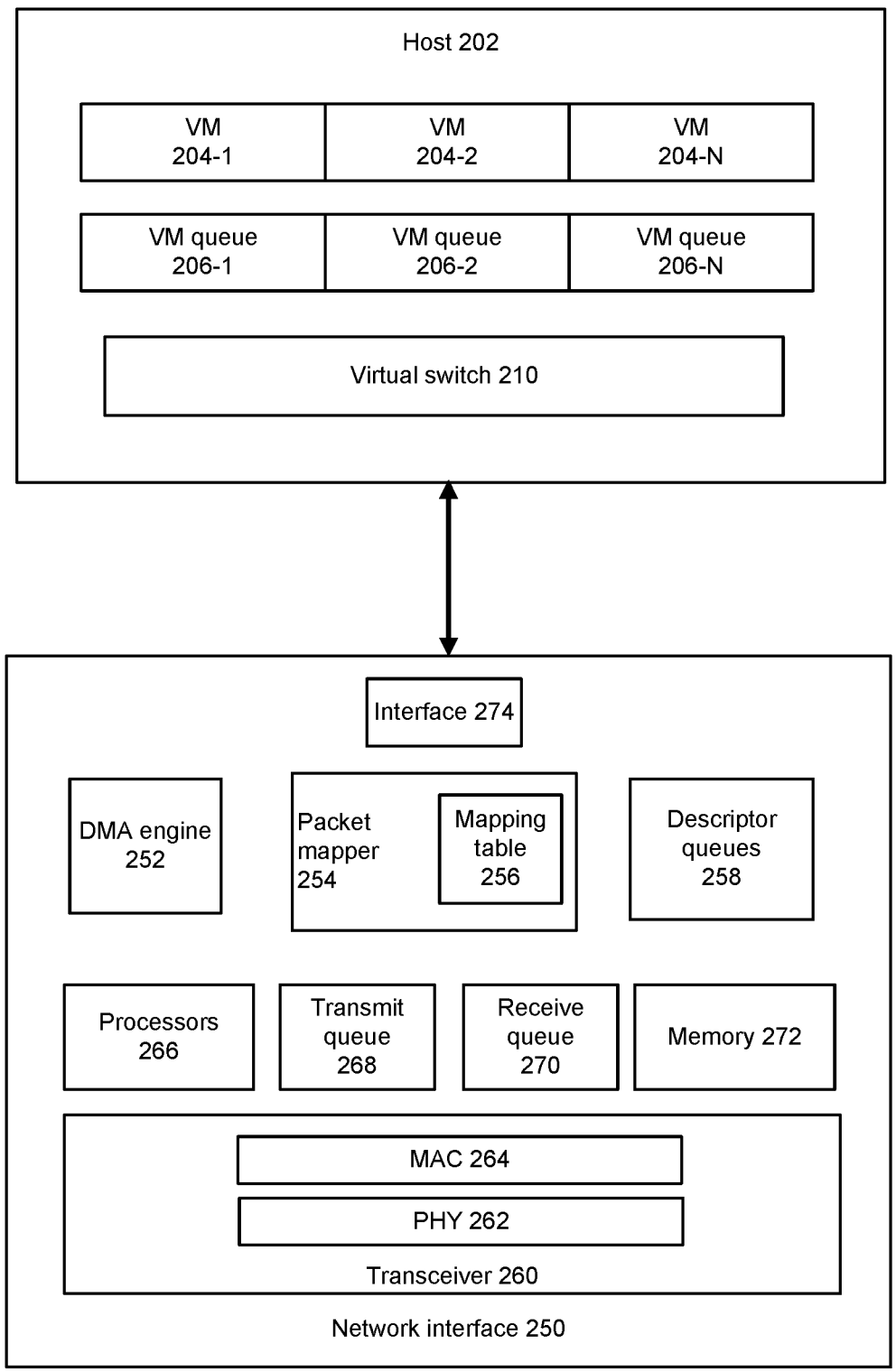
FIG. 2 depicts a simplified block diagram of a host and a network interface.

FIG. 2 depicts a simplified block diagram of a host and a network interface. Host 202 can be any computing platform with compute, interconnect, memory, storage, and network resources that are not depicted. For example, host 202 can include one or more processors, interconnects, one or more memory, one or more storage devices, and one or more network interfaces. Host 202 can allow use of virtual machines. VMs 204-1 to 204-N can be any virtual machine that can run on host 202. VM queues 206-1 to 206-N can be associated with respective VMs 204-1 to 204-N.

For a packet transmission, virtual switch 210 can detect that a transmit packet and/or descriptor is formed in a VM queue and virtual switch 210 can request the packet header, payload, and/or descriptor be transferred to network interface 250 using DMA engine 252. Descriptor queues 258 can receive the descriptor for the packet to be transmitted. Network interface 250 can transmit the packet. For example, a packet can have a header that identifies the source of the packet, a destination of the packet, and routing information of the packet. A variety of packet protocols can be used, including, but not limited to Ethernet, FibreChannel, Infiniband, or Omni-Path. Host 202 can transfer a packet to be transmitted from a VM buffer to network interface 250 for transmission without use of an intermediate buffer.

Virtual switch 210 can monitor properties of the transmitted packet header to determine if those properties are to be used to update mapping table 256 or add a mapping in mapping table 256. To program a mapping table, a source IP address of a packet transmitted from VM 204-1 can be used. A mapping is created in the table between that source IP address and VM queue 206-1 is assigned for that mapping. A packet received by network interface 250 with a destination IP address equal to the value of the source IP address of VM 204-1 is placed in mapped VM queue 206-1. In this example, the source IP address is used to program the mapping, but it is the destination IP address that is an inspected characteristic or property of packets received on the network card, to determine where to route them. Thereafter, a received packet having a property or properties that match the mapping rule is transferred from network interface 250 to VM queue 206-1 using DMA engine 252. For example, if a VM 204-1 requests packet transmission from a source IP address of 2.2.2.2, and if no mapping rule for VM 204-1 is in mapping table 256, then virtual switch 210 can add a mapping of a received packet with a destination IP address of 2.2.2.2 to VM queue 206-1, which is associated with VM 204-1.

Virtual switch 210 can be any software and/or hardware device that provides one or more of: visibility into inter-VM communication; support for Link Aggregation Control Protocol (LACP) to control the bundling of several physical ports together to form a single logical channel; support for standard 802.1Q VLAN model with trunking; multicast snooping; IETF Auto-Attach SPBM and rudimentary required LLDP support; BFD and 802.1ag link monitoring; STP (IEEE 802.1D-1998) and RSTP (IEEE 802.1D-2004); fine-grained QoS control; support for HFSC qdisc; per VM interface traffic policing; network interface bonding with source-MAC load balancing, active backup, and L4 hashing; OpenFlow protocol support (including many extensions for virtualization), IPv6 support; support for multiple tunneling protocols (GRE, VXLAN, STT, and Geneve, with IPsec support); support for remote configuration protocol with C and Python bindings; support for kernel and user-space forwarding engine options; multi-table forwarding pipeline with flow-caching engine; and forwarding layer abstraction to ease porting to new software and hardware platforms. A non-limiting example of virtual switch 210 is Open vSwitch (OVS), described at https://www.openvswitch.org/.

An orchestrator, cloud operating system, or hypervisor (none depicted) can be used to program the virtual switch. For example, OpenStack, described at https://www.openstack.org/can be used as a cloud operating system. The orchestrator, cloud operating system, or hypervisor can be executed on host 202 or a different physical computing platform.

For a received packet, network interface 250 can use a packet mapper 254 to route received packets and/or associated descriptors to a VM queue in host 202. Descriptor queues 258 can be used to store descriptors of received packets. Packet mapper 254 can use mapping table 256 to determine which characteristics of a received packet to use to map to a VM queue. A queue can be a region of memory that is able to be accessed by a virtual machine. Any content in the queue can be accessed in first-received-first-retrieved manner or according to any order that the virtual machine or other software or hardware requests. For example, a source IP address of 2.2.2.2 specified in a header of a received packet can be associated with a VM queue 206-1 in mapping table 256. Based on mapping in mapping table 256, network interface 250 can use a direct memory access (DMA) engine 252 to copy a packet header, packet payload, and/or descriptor directly to a VM queue, instead of copying the packet to an intermediate buffer and then using another copy from the intermediate buffer to the VM buffer.

Network interface 250 can also include transceiver 260, processors 266, transmit queue 268, receive queue 270, memory 272, and bus interface 274. Transceiver 260 can be capable of receiving and transmitting packets in conformance with the applicable protocols such as Ethernet as described in IEEE 802.3, although other protocols may be used. Transceiver 260 can receive and transmit packets from and to a network via a network medium. Transceiver 260 can include PHY circuitry 262 and media access control (MAC) circuitry 264. PHY circuitry 262 can include encoding and decoding circuitry (not shown) to encode and decode data packets. MAC circuitry 264 can be configured to assemble data to be transmitted into packets, that include destination and source addresses along with network control information and error detection hash values. Processors 266 can be any processor, core, graphics processing unit (GPU), or other programmable hardware device that allow programming of network interface 250. For example, processors 266 can execute packet mapper 254. Memory 272 can be any type of volatile or non-volatile memory device and can store any queue or instructions used to program network interface 250. Transmit queue 268 can include data or references to data for transmission by network interface. Receive queue 270 can include data or references to data that was received by network interface from a network. Descriptor queues 258 can reference data or packets in transmit queue 268 or receive queue 270. Bus interface 274 can provide an interface with host 202. For example, bus interface 274 can be compatible with PCI, PCI Express, PCI-x, Serial ATA, and/or USB compatible interface (although other interconnection standards may be used).

Figure 3A:
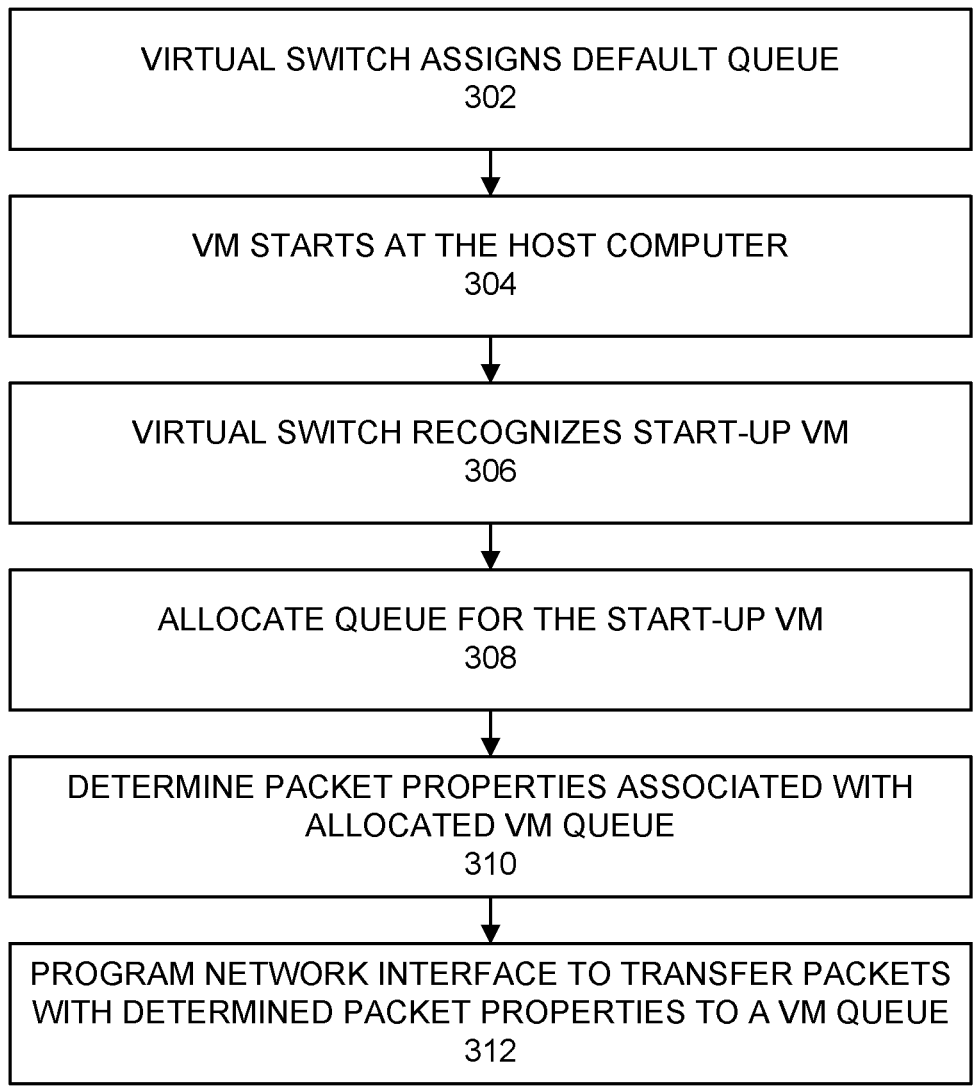
FIG. 3A depicts an example process to assign a queue to a received packet header, payload, or descriptor based on a property of the received packet.

FIG. 3A depicts an example process to assign a VM queue to a received packet header, payload, and/or descriptor based on a property of the received packet. At 302, when no VM is active or running, a default queue is assigned for packets with headers having unrecognized properties. A virtual switch can allocate a default queue in system memory of a host computer and the default queues will store packets that do not have any associated VM or do not have an associated mapping rule. At 304, a VM starts at the host system and at 306, a virtual switch recognizes the started-up VM. When a new VM is instantiated at the host system, a virtual switch recognizes the started-up VM. For example, the started-up VM registers with the virtual switch using for example, a socket or link with the virtual switch. At 308, the started-up VM allocates memory for its queue(s). However, if a maximum number of queues available for allocation to a network interface has already been reached, then a queue associated with an inactive VM may be cleared of content, or its content encrypted and unable to be accessed by the new VM, and the queue associated with the inactive VM may be allocated for use by the new VM.

At 310, the virtual switch can determine packet properties associated with the new queue(s). A new (e.g., start-up) VM causes packets to be transmitted using a network interface. The virtual switch inspects properties of the transmitted packets and determines associations between subsequently received packets having those properties and the new VM. At 312, the virtual switch programs the network interface to transfer packets having the properties to a queue associated with the new VM. For example, the network interface can use a mapping table to associate characteristics of a packet (e.g., source or destination IP address, Multiprotocol Label Switching (MPLS) label, source or destination MAC address, or packet size) with a VM queue. Other fields/identifiers could be used such as VLAN ID, Tunnel header information (e.g., VxLAN Virtual Network Identifier (VNI)), TCP destination port, etc. Received packets are inspected to determine characteristics associated with VM queue. The network interface can use a DMA operation to transfer the packet to the appropriate VM queue.

For example, the virtual switch inspects transmitted packets and determines an IP address or MAC address, or other properties of headers of the transmitted packets. The virtual switch creates a rule for a particular IP address or MAC address combination to route packets with that combination to a queue(s) allocated for the new VM. Virtual switch modifies a mapping table accessible to a network interface to associate packet properties with a destination VM queue. The result of the classification will be a single action, e.g., "send to VM1 queue" or "drop" and so forth. Accordingly, a packet header, payload, and/or descriptor can be transferred using a DMA operation to the new VM queue(s) without a copy to an intermediate buffer.

The virtual switch programs the mapping of VM queues to packet properties and can recognize if there is a conflicting rule, e.g., "send packet with destination IP 1.1.1.1 to VM1" and "send packet with destination IP 1.1.1.1 to VM2." In this case, the virtual switch may not permit the second rule to be programmed, and the virtual switch of other software can report a warning to the user. A priority scheme could be implemented whereby the user or orchestrator informs the virtual switch of priorities associated with different VMs and the VMs with the higher priorities get preference when mapping conflicts occur. In such case, if a VM2 has a higher priority than VM1, then VM2 will retain a mapping of "send packet with destination IP 1.1.1.1 to VM2" and VM1 will lose its mapping rule in the mapping table.

For example, a VM1 boots up and requests transmission a packet from a source IP address of 1.1.1.1 and virtual switch can detect the packet transmission. Virtual switch can determine that a received packet intended to be received at a destination IP address of 1.1.1.1 is associated with VM1 and assign VM1 buffer to the destination IP address of 1.1.1.1. Likewise, a VM2 requests transmission a packet from a source IP address of 2.2.2.2 and the virtual switch can detect the packet transmission. Virtual switch can determine that a received packet with a destination IP address of 2.2.2.2 is associated with VM2 and assign VM2 buffer to packets received that have a destination IP address of 2.2.2.2. Accordingly, this mapping causes any packets with destination IP address of 1.1.1.1 and/or associated descriptors that are received by a network interface to be transferred via DMA to a packet queue for VM1 or any packets with destination IP address of 2.2.2.2 and/or associated descriptors that are received by the network interface to be transferred via DMA to a packet queue for VM2. Packets satisfying criteria in the mapping are transferred using DMA directly to the appropriate VM queue.

In some cases, multiple VM queues can be assigned to a VM. The virtual switch maps different rules to different queue. For example, if a packet has a particular destination IP, the packet and/or its descriptor is transferred to VM queue 1. If a packet has a particular MPLS label, the packet and/or its descriptor is transferred to VM queue 2.

A verification process can be applied to make sure the mapping or routing rules applied to received packets are in keeping with the existing routing rules programmed in the virtual switch by the user or orchestrator. An example verification process is to allow the packet to traverse the virtual switch classification path and discover whether the outcome of the packet mapper mapping in the network interface is the same as the outcome of the virtual switch classification. If there is a mismatch, the packet can be discarded from the VM queue and the software classification can be used as the mapping or routing rule, e.g., send to a different VM queue.

Figure 3B:
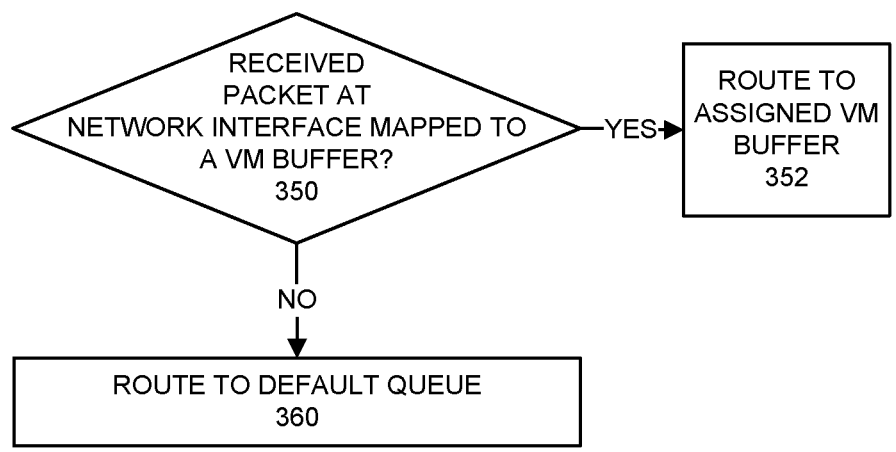
FIG. 3B depicts an example process performed by a network interface to assign a queue to a received packet.

FIG. 3B depicts an example manner performed by a network interface to assign a VM queue to a received packet. Various packet characteristics can be identified such that packets having those characteristics are allocated to a VM queue and accessible by the related VM. For example, assignment of a VM queue based on packet characteristics can be made using a process such as or similar to that of FIG. 3A. At 350, a determination is made as to whether a received packet at a network interface is mapped to a particular VM buffer or queue. If so, then at 352, the network interface uses a DMA operation to transfer packet header, payload, and/or descriptor to the associated VM queue. However, for a received packet that does not have a characteristic that is associated with a VM queue, then at 360, the network interface can use a DMA operation to transfer the received packet header, payload, and/or descriptor to the default VM queue. For example, if the network interface does not support a particular routing rule for the received packet such as when there is an unrecognized tag, unrecognized header, those received packets are transferred to the default queue.

Figure 3C:
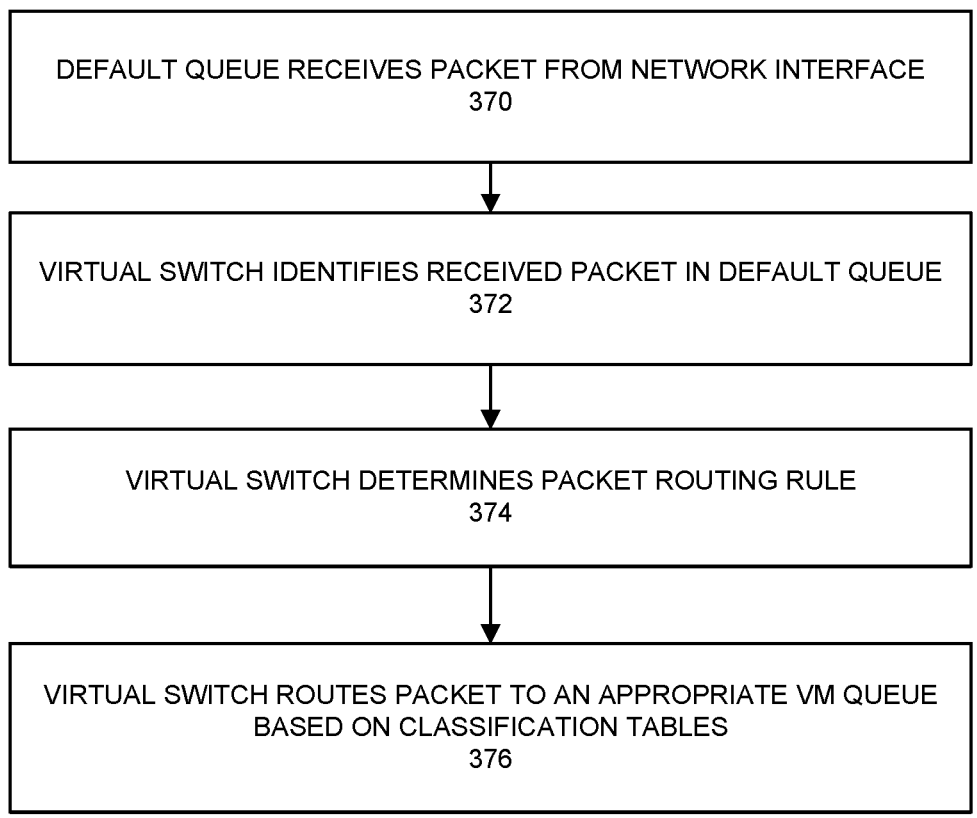
FIG. 3C depicts an example process that can be used to manage a received packet that does not have a classification in the network interface.

FIG. 3C depicts an example process that can be used to manage a received packet that does not have a classification in the network interface. At 370, a received packet with characteristics not identified by the network interface is routed to the default queue. For example, a mapping or routing rule for a packet with such characteristics may not have been created yet. At 372, a virtual switch identifies a received packet in the default queue. At 374, the received packet is classified by the flow tables in the virtual switch on the host. For example, flow tables can be programmed in the virtual switch by the user or orchestrator. At 376, the virtual switch routes the packet to the appropriate VM queue based on its local software classification flow tables.

Figure 3D:
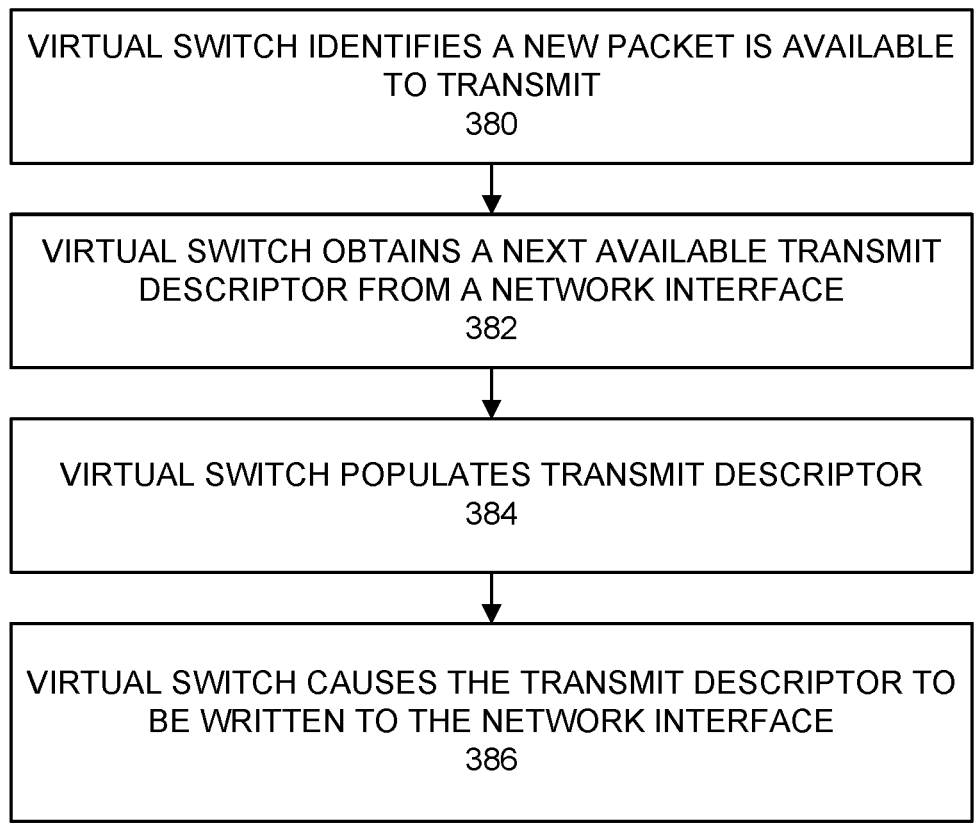
FIG. 3D depicts an example process to transmit a packet.

FIG. 3D depicts an example process that can be used to transmit a packet. At 380, a virtual switch determines that a new packet is available to transmit. For example, the virtual switch polls a VM interface and when a new packet or its descriptor is available in the VM queue, the virtual switch accesses the VM queue to access the descriptor describing the new packet. At 382, the virtual switch obtains a next available transmit descriptor from a network interface. At 384, the virtual switch populates the transmit descriptor with information from the descriptor in the VM queue including the location of the packet data (header and body). At 386, the virtual switch writes the filled transmit descriptor to the network interface using a DMA operation. Instead of writing the filled descriptor to the network interface, a pointer to the filled transmit descriptor can be transferred to the network interface using a DMA operation or other write operation. The filled transmit descriptor or its pointer can be stored in a transmit queue of the network interface. The network interface transmits packet formed from its header and body to a recipient.

Figure 4:
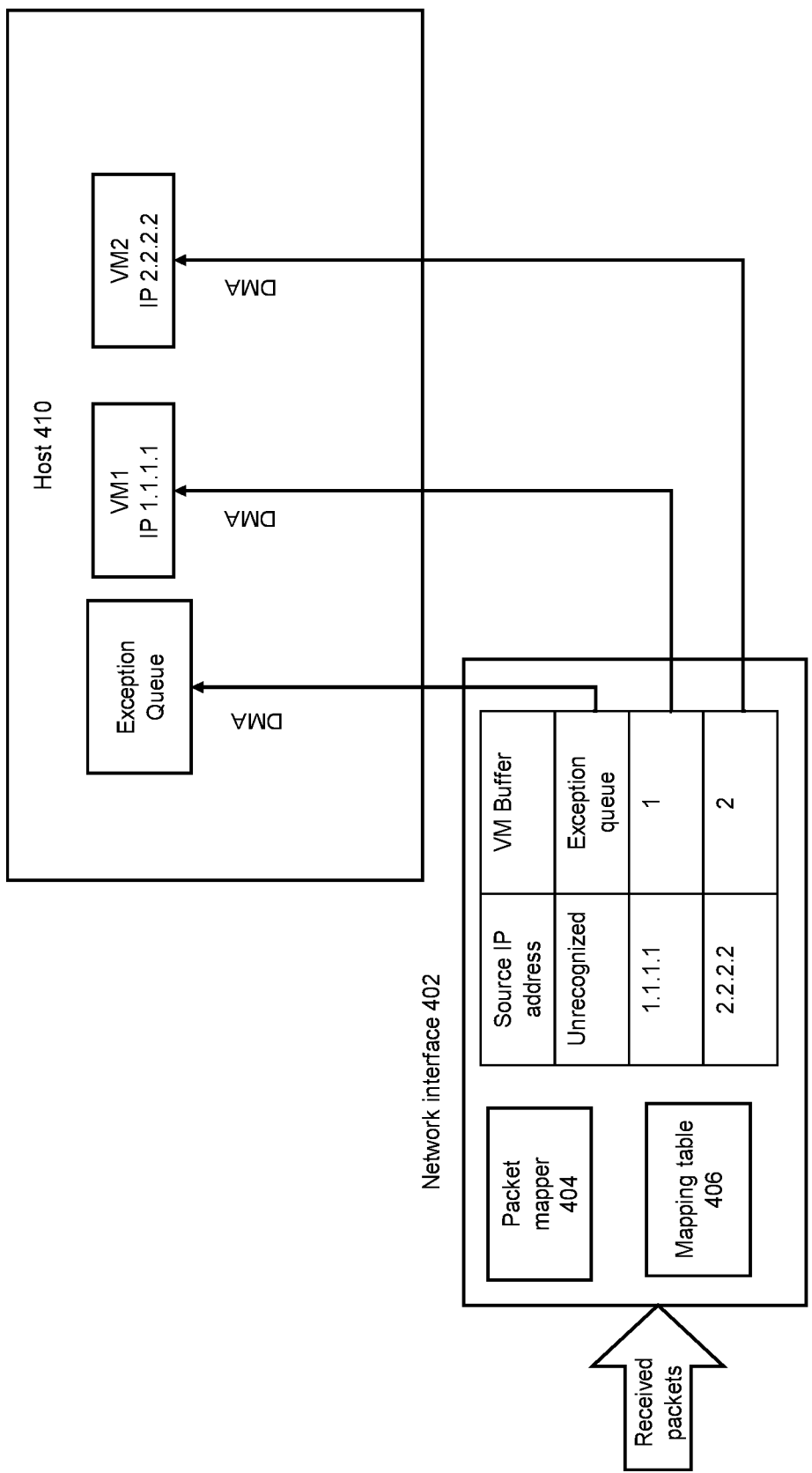
FIG. 4 depicts a simplified example of a network interface routing received packets to a queue associated with a virtual machine that is to process the packet.

FIG. 4 depicts a simplified example of a network interface 402 routing received packets to a VM buffer associated with a VM that is to process the packet. Network interface 402 can use packet mapper 404 to determine which VM queue or buffer to route the received packet based on information in the header of the received packet. For example, packet mapper 404 can use a mapping table 406 that associates a destination IP address of a received packet with a VM buffer. A received packet can have a header section and a body section. The header section can include a variety of information in compliance with the applicable protocol specification. In some embodiments, the header can include a source IP address. The source IP address is associated with a VM buffer index, where an index is 1, 2, and so forth.

Network interface 402 can invoke a DMA operation to copy a header and/or body of a received packet to the VM buffer associated with the received packet. For example, a source IP address of 1.1.1.1 is associated with VM buffer 1. A received packet having a header that identifies a source IP address of 1.1.1.1 can be copied directly to VM buffer 1. However, if a source IP of a received packet is unrecognized, the packet is copied to an exception (e.g., default) queue.

Figure 5:
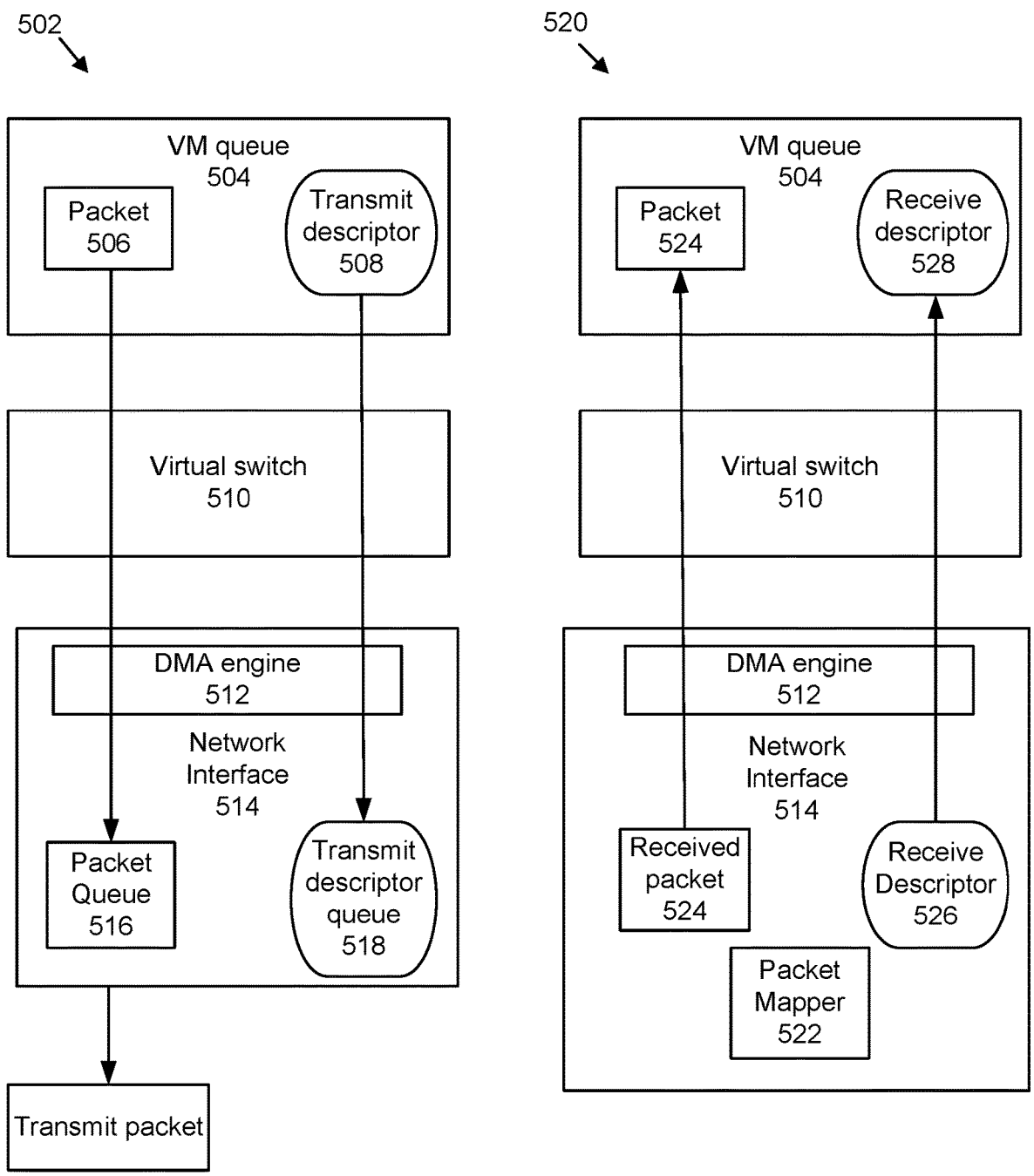
FIG. 5 depicts an example of packet and descriptor transfers.

FIG. 5 depicts an example of transfer of packet header, payload, and descriptor. For example, flow 502 shows an example of a packet transmission. A packet 506 is formed and stored in VM queue 504 for example by a VM (not depicted). Virtual switch 510 can monitor for formation of a packet 506 or its transmit descriptor 508. After or when packet 506 is formed, virtual switch 510 can request DMA engine 512 to copy the header, payload, and/or associated transmit descriptor 508 to network interface 514. For example, DMA engine 512 can write header and payload of packet 506 to packet queue 516 and write transmit descriptor 508 to transmit descriptor queue 518. In some embodiments, instead of copying transmit descriptor 508 to transmit descriptor queue 518, DMA engine 512 can write a pointer to transmit descriptor 508 into transmit descriptor queue 518. Network interface 514 can transmit packet 506 according to its priorities.

Flow 520 shows an example of packet receipt. In response to receipt of a packet at network interface 514, network interface 514 forms a receive descriptor 526 for received packet 524. Packet mapper 522 recognizes characteristics of received packet 524 that are used to indicate that a destination queue for received packet 524 is VM queue 504. Packet mapper 522 causes DMA engine 512 to write header and/or payload of packet 524 to VM queue 504 and receive transmit descriptor 526 to receive descriptor queue 528 in VM queue 504. In some embodiments, instead of copying receive descriptor 526 to receive descriptor queue 528, DMA engine 512 can write a pointer to receive descriptor 526 into receive descriptor queue 528.

Figure 6:
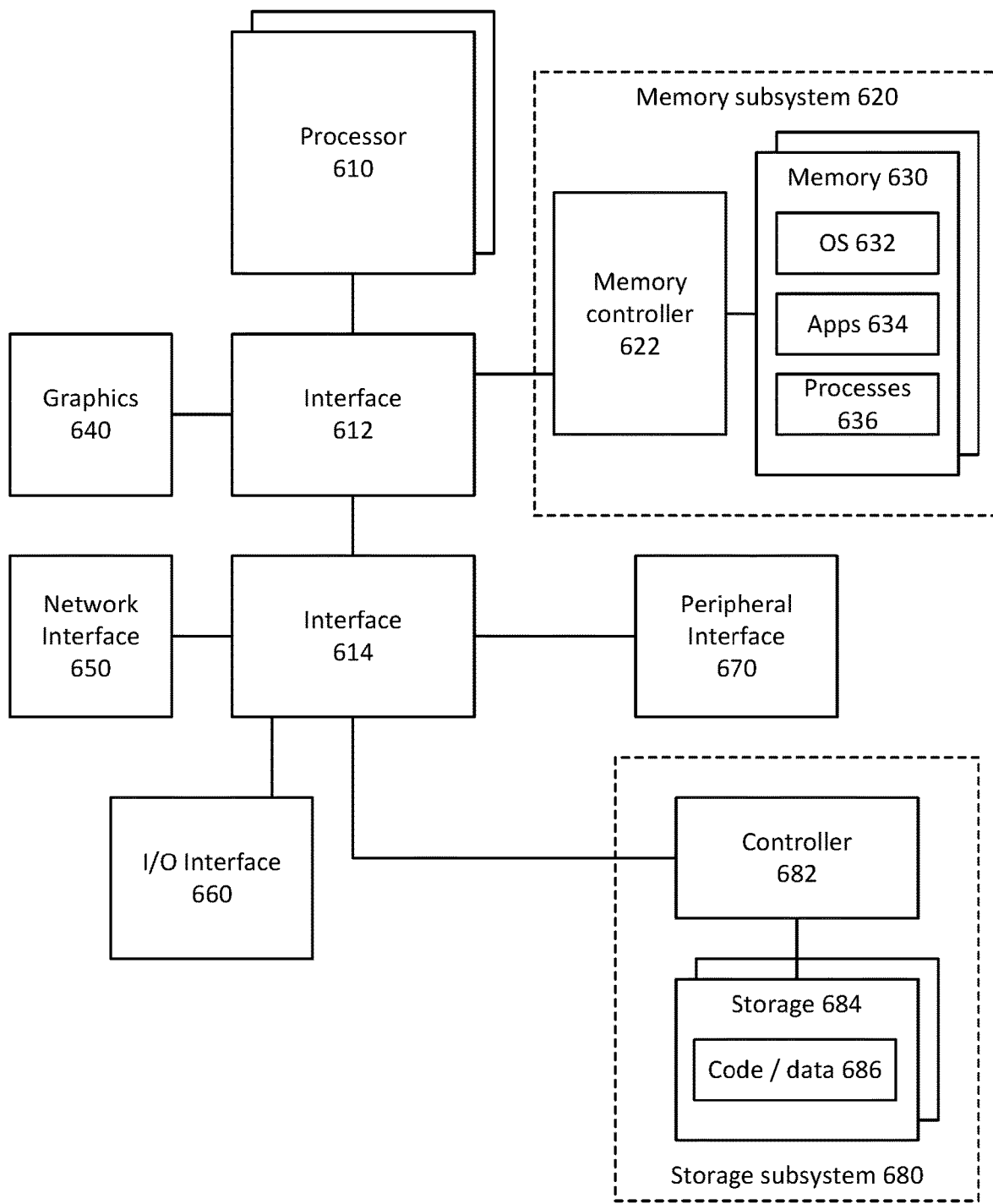
FIG. 6 is a block diagram of an example of a computing system.

FIG. 6 is a block diagram of an example of a computing system. System 600 represents a computing device in accordance with any example herein, and can be a laptop computer, a desktop computer, a tablet computer, a server, group of servers, a gaming or entertainment control system, a scanner, copier, printer, routing or switching device, embedded computing device, a smartphone, a wearable device, an internet-of-things device or other electronic device.

System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1364 bus.

In one example, system 600 includes interface 614, which can be coupled to interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

The appearances of the phrase "one embodiment," "an embodiment," "one example" or "an example" are not necessarily all referring to the same example or embodiment. Any aspect described herein can be combined with any other aspect or similar aspect described herein, regardless of whether the aspects are described with respect to the same figure or element.

The order of operations set forth in any flow chart are examples and any operation can be performed in a different order than set forth or at the same time or overlapping time with another operation.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

What is claimed is:

1. A system comprising:
a network interface device comprising:
a direct memory access (DMA) circuitry and circuitry communicatively coupled to the DMA circuitry, wherein:
the circuitry is to select a target queue associated with a target virtual machine for a received packet based on at least one characteristic of the received packet and to cause the DMA circuitry to copy the received packet and a descriptor associated with the received packet directly to the target queue associated with the target virtual machine and
the selected target queue is among multiple target queues associated with multiple virtual machines.

2. The system of claim 1, wherein:
the circuitry is to determine the at least one characteristic based on a packet transmitted from the target queue by the target virtual machine, wherein transmission of the packet from the target queue is to identify the target queue to receive at least one packet directed to the target virtual machine.

3. The system of claim 1, wherein the at least one characteristic of a received packet associated with the target queue comprises one or more of: a source IP address, a destination IP address, a source MAC address, a destination MAC address, an MPLS label VLAN ID, tunnel header information, VxLAN Virtual Network Identifier, or TCP destination port.

4. The system of claim 1, wherein:
the circuitry is to cause copying of a second received packet a default queue
based on the second received packet not having an associated target queue.

5. The system of claim 1, further comprising a at least one processor and at least one memory, wherein the at least one processor and the at least one memory are communicatively coupled to the network interface device and wherein the at least one memory comprises the target queue.

6. The system of claim 5, wherein:
in response to formation of a transmit packet for transmission in the target queue, the circuitry is to cause copy of one or more of: the transmit packet header, transmit packet payload, transmit packet descriptor, or pointer to the transmit packet descriptor to the network interface device by use of a DMA operation.

7. The system of claim 1, wherein the direct memory access (DMA) circuitry is to provide an interrupt to a processor that executes the target virtual machine to indicate availability of the received packet in the target queue.

8. The system of claim 1, wherein a virtual switch is to configure the circuitry to select a target queue associated with a target virtual machine for a received packet based on at least one characteristic of the received packet and to cause the DMA circuitry to copy the received packet and a descriptor associated with the received packet directly to the target queue associated with the target virtual machine.

9. The system of claim 1, wherein the target queue is consistent with Virtio.

10. The system of claim 1, wherein the target queue is allocated for packets to be transmitted and received packet for the target virtual machine.

11. A method comprising:
at a network interface device:
applying a first rule to copy a received packet with at least one characteristic to a target queue; and
copying one or more of the received packet header, body, or descriptor, using a direct write operation, to the target queue in response to the received packet satisfying the first rule, wherein:
the target queue is associated with a target virtual machine and
the target queue is among multiple target queues associated with multiple virtual machines.

12. The method of claim 11, further comprising:
causing a packet to be transmitted at a request of the target virtual machine, wherein the first rule is specified based on at least one characteristic of the packet to be transmitted.

13. The method of claim 11, further comprising:
in response to formation of a transmit packet for transmission from a second queue, causing transfer of one or more of: the transmit packet header, transmit packet payload, transmit packet descriptor, or pointer to the transmit packet descriptor to the network interface device by use of a direct write operation.

14. The method of claim 11, wherein the at least one characteristic of the received packet associated with the target queue comprises one or more of: a source IP address, a destination IP address, a source MAC address, a destination MAC address, an MPLS label VLAN ID, tunnel header information, VxLAN Virtual Network Identifier, or TCP destination port.

15. The method of claim 11, further comprising:
receiving a second packet and
writing one or more of a packet header, body, or descriptor associated with the second packet using a direct write operation to a default queue in response to the second packet not satisfying the first rule.

16. At least one non-transitory computer-readable medium comprising instructions stored thereon, that if executed by at least one processor, cause the at least one processor to:

program a network interface device to:
  apply a first rule to write received packets to a first queue in response to the received packets including a first characteristic and
  copy a first packet to the first queue via a direct write operation based on the network interface device applying the first rule and the first packet satisfying the first rule, wherein:
  the first queue is associated with a target virtual machine and
  the first queue is among multiple target queues associated with multiple virtual machines.

17. The at least one computer-readable medium of claim 16, further comprising instructions stored thereon, that if executed by at least one processor, cause the at least one processor to:
  program the network interface device to:
  in response to formation of a transmit packet for transmission from the first queue, copy one or more of: the transmit packet header, transmit packet payload, transmit packet descriptor, or pointer to the transmit packet descriptor at the network interface device by use of a direct write operation.

18. The at least one computer-readable medium of claim 16, wherein the first characteristic comprises one or more of: a source IP address, a destination IP address, a source MAC address, a destination MAC address, an MPLS label VLAN ID, tunnel header information, VxLAN Virtual Network Identifier, or TCP destination port.

19. The at least one computer-readable medium of claim 16, further comprising instructions stored thereon, that if executed by at least one processor, cause the at least one processor to:
  program the network interface device to:
  in response to a received packet not satisfying the first rule, write to a second queue using a direct write operation: one or more of the received packet header, body, or descriptor associated with the received packet.

20. A system comprising:
  a network interface device;
  at least one memory; and
  at least one processor communicatively coupled to the network interface and the at least one memory, the at least one processor configured to:
    execute a virtual machine;
    associate a first queue with the virtual machine;
    associate a second queue with no particular virtual machine;
    determine a first rule comprising at least one characteristic of a received packet to associate with the first queue; and
    program the network interface device with the first rule to copy a first received packet satisfying the first rule by direct memory access (DMA) to the first queue, wherein
    the first queue is among multiple target queues associated with multiple virtual machines.

21. The system of claim 20, wherein the at least one characteristic of the received packet to associate with the first queue comprises one or more of: a source IP address, a destination IP address, a source MAC address, a destination MAC address, an MPLS label VLAN ID, tunnel header information, VxLAN Virtual Network Identifier, or TCP destination port.

22. The system of claim 20, wherein the network interface device comprises at least one of a wired or wireless network interface and further comprising at least one of: a power supply coupled to the at least one processor and the at least one memory, a bus coupled to the at least one processor and the at least one memory, or non-volatile memory coupled to the at least one processor and the at least one memory.

* * * * *